Patented Mar. 17, 1953

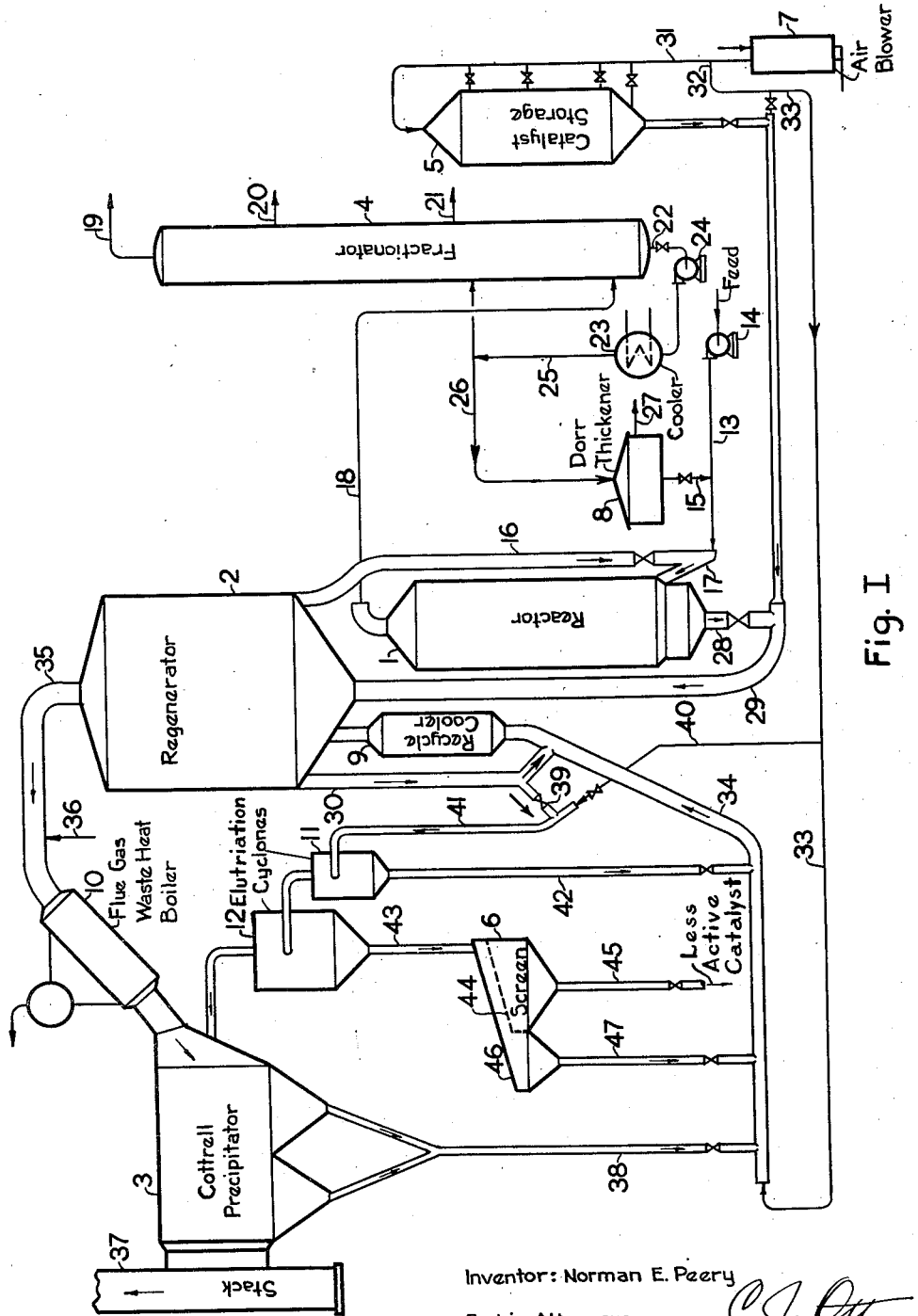
Fig. I

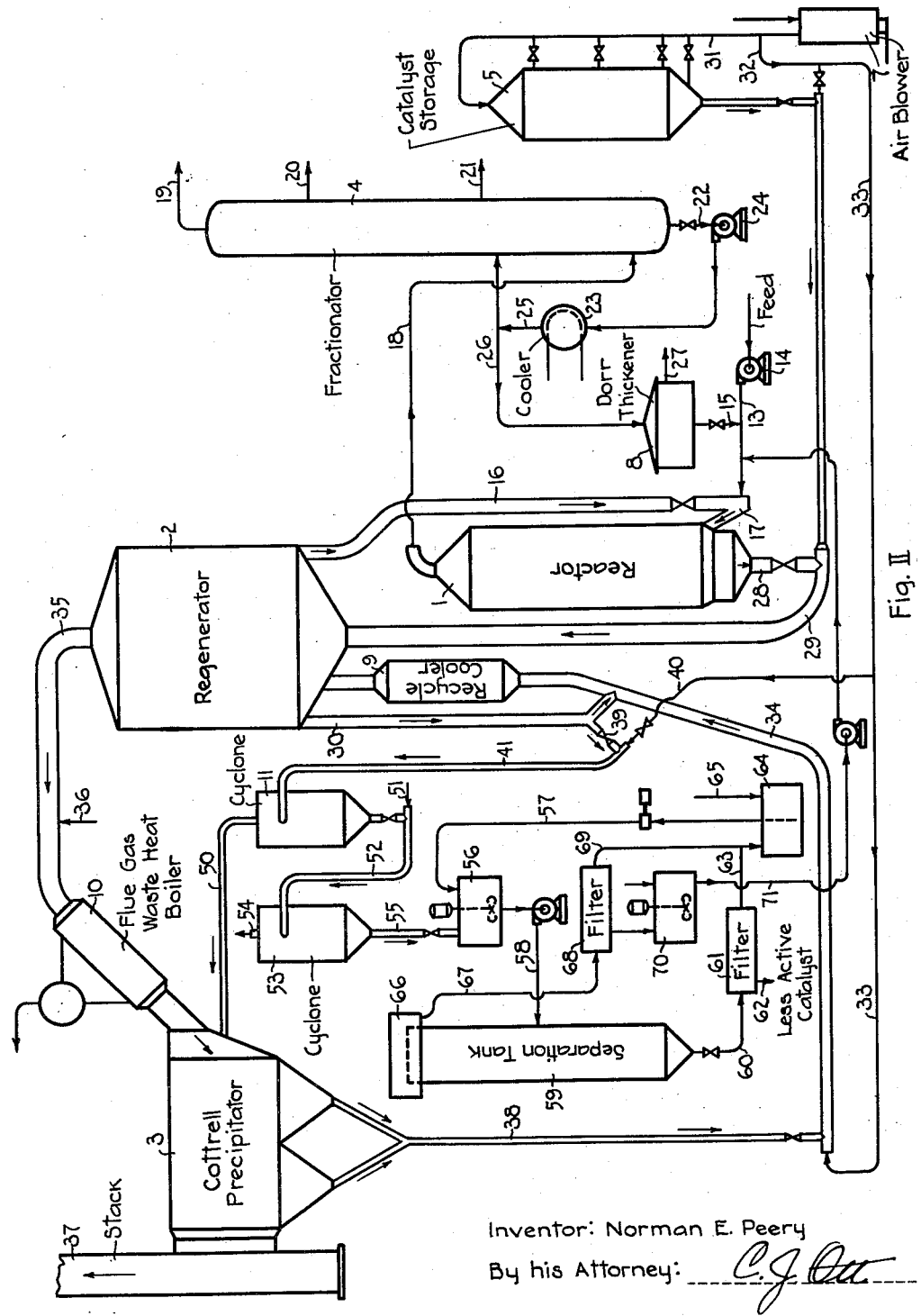

2,631,974

UNITED STATES PATENT OFFICE 2,631,974

SULFURIC ACID RECOVERY PROCESS

John W. Conwell, St. Albans, W. Va., assignor to American Viscose Corporation, Wilmington, Del., a corporation of Delaware Application January 6, 1950, Serial No. 137,161

9 Claims. (Cl. 204—104)

This invention relates to an electrolytic system for the recovery of certain ingredients from the waste liquors discharged from various chemical processes. It is particularly concerned with the recovery of sulfate ions in acid aqueous solutions containing them by the conversion thereof into aqueous sulfuric acid solutions of sufficient purity to be of commercial value. It is also concerned with the recovery of certain metals in the form of precipitatable compounds thereof.

The object of this invention is to provide effective and economical means of recovering sulfuric acid from dilute solutions of the same or from those of acid sulfates such as $NaHSO_4$ as are frequently found in the effluent of certain chemical plants. A secondary object is to recover certain metals, such as zinc, from such dilute solutions.

This invention consists essentially of exposing the dilute acid sulfate solution to electrodes of $PbO_2$ and $Pb$ respectively, which are connected electrically with an external source of direct current so that current flows through the system in the same direction relative to the electrodes as that of the lead-acid type of storage cell during normal discharge. During the passage of current, a spontaneous fixation of the sulfate ions takes place on both electrodes with the formation of $PbSO_4$. Some current is generated during this formation and it supplements that produced by the external source. Its recovery or consumption for heating or electromotive purposes is incidental to the main purpose of this invention.

The rate of sulfate fixation is a function of sulfate ion and hydrogen ion concentration, decreasing with lower concentrations in accordance with well-known principles of electrochemistry. It is also a function of the current passing through the system. Because of this latter relationship, it is possible to obtain increased rate of fixation, to remove a larger proportion of the sulfate ions, and to regulate the rate of fixation in a simple manner.

After deposition of the sulfate, the spent solution is removed from contact with the electrodes and a suitable external direct current voltage is impressed in the opposite direction (i. e., in the normal direction of charging or regeneration of the lead-acid type of cell) with water or dilute aqueous sulfuric acid surrounding the electrodes. In some special situations, the aqueous acid waste may be sufficiently pure (though of low concentration) to be used as the dilute acid medium in which recovery is performed. In this stage, sulfuric acid solution is formed in accordance with the following equation:

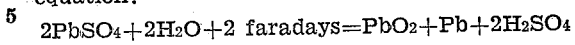

$2PbSO_4 + 2H_2O + 2\ faradays = PbO_2 + Pb + 2H_2SO_4$

The electrodes may then be reused to fix additional sulfate from dilute waste liquor.

Various types of equipment for carrying out the process are possible. In one type, the electrodes remain in the same container at all times, and the liquid is changed as required to fix sulfate on the one hand and recover it as sulfuric acid on the other. In order to provide a continuous process of sulfuric acid or sulfate recovery, the cells may be arranged in the form of a ring. As shown in the attached Figure 1, the liquid effluent enters into cell 3 and will flow in series through cells 3, 4 and 5 from the last of which it is discharged. The cell containers are provided with conduits 6 having valves or cocks 7 for controlling entrance of the effluent or influent waste liquor to be treated and discharge of the effluent treated liquid. Flexible or rigid insulated conduits 8, such as of rubber, may be used to connect the cells in series. While three cells are connected in series in Figure 1, any number may be so connected, or, if desired, each cell may process separately. The lead electrode in each cell is designated 9 and the lead oxide electrode 10. The electrodes may be of commercial grade, such as conventionally used in the lead-acid storage battery. During the fixation cycle of Figure 1, the current flows through a resistance or equivalent current-consuming load 11 and through cells 3, 4 and 5 in series, the cells being connected in series with a direct current source 17 having a potential sufficient to force current through the cells, by conductors 12, 13, and 14 respectively. The waste liquor to be treated is introduced continuously or intermittently at A and is discharged at B.

Figure 2 shows a cell $x$ in process of sulfate regeneration which is electrically connected with a direct current power source 18 of a voltage exceeding the potential of the cell or cell aggregate in the circuit with the positive side of the source 18 connected to the lead oxide electrode 10 and the negative side to the lead electrode 9. The cell potential may vary, depending on the electrolyte concentration and acidity, from a value of substantially less than 2 volts up to somewhat more than 2 volts. The voltage of the source 18 may accordingly vary widely. When a single cell is in the regenerating circuit as in Figure 2, the potential of source 18 may be from about 2 to 2.5 or 3 volts whereas if the cell aggregate being regenerated had a potential of 24 volts, an external source 18 of 26 to 28 volts would be quite practical. Before the cell is transferred from the lead sulfate fixation stage of Figure 1 to the sulfate ion regeneration stage of Figure 2, the liquid content is removed from the cell and replaced either with water or a dilute sulfuric acid solution into which the sulfuric acid is to be introduced.

The cycle of operation is preferably as follows: When the desired amount of sulfate has been removed from the electrodes in cell $x$ (Fig. 2), the sulfuric acid solution is removed, cell 3 is cut out of the electrical circuit of Figure 1 and drained of its contents, preferably while blanketing the exposed portions of the electrodes with a non-oxidizing atmosphere, such as of nitrogen, carbon dioxide, helium, and the like, after which the sulfuric acid solution from cell $x$ may be transferred to cell 3. The effluent or waste liquor to be treated is then introduced in cell 4 and flows in succession through cells 4, 5 and $x$, from which it is then discharged. Cell $x$ may have its terminals connected in series with cells 4 and 5 through the current-consuming load 11. The electrical circuit in Figure 2 is then connected to cause current to flow through cell 3 in normal charging direction which is opposite to that occurring during fixation in the system of Figure 1. The sulfate is thereby regenerated as sulfuric acid. This process is then continued in cyclical manner until the regenerated sulfuric acid is at the desired strength at which time it may be withdrawn for use and replaced by water or dilute acid.

Figure 3 shows a system for sulfate fixation in accordance with the invention utilizing a single cell $3a$ in which the electrodes 9 and 10 of lead and lead oxide respectively are connected with an external source of direct current 19, the positive side of which is connected with the lead electrode 9. The electrolyte may be introduced continuously or intermittently by the connection $6a$ and discharged by the connection $6a'$.

Figure 4 illustrates a modification in which the cells $3b$ and $4b$ are connected in parallel with the waste liquor supply header 20 and discharge header 21 by means of branch pipes 22, 23, 24 and 25. Any number of cells may thus be connected in parallel. The cells may be connected electrically either in parallel or in series. As shown, a direct current source 26 has its positive side connected with the lead electrode $9b$ of cell $4b$ and its negative side to the lead oxide electrode $10b$ of cell $3b$. The other two electrodes are connected with a current-consuming load 27 by means of the line 28.

A plurality of cells may be connected in any suitable fashion, either in parallel or in series with one or more external sources of direct current. The number of cells that can be so connected depends upon the voltage of the external source or sources. For example, it is possible to connect any number of like cells in series with a direct current source as long as the voltage impressed upon each of the cells is sufficiently in excess of each of the cell potentials. Additional cells may be connected in parallel, if desired, and in all of such cases, the voltage must exceed the effective potential of the cell aggregate in the circuit and be sufficient to carry out the electrolytic process satisfactorily.

In a cell, such as that of Figure 3, a waste liquor containing 0.44% sulfuric acid, 1.16% sodium sulfate, and 0.04% zinc sulfate, and substantially all the rest water, was electrolyzed with an electrode area of 450 square inches in an electrolyte volume of 750 cc. During 30 minutes operation without a direct current source 19, 35% of the acid was fixed on the electrodes whereas with the direct current source 19 in circuit, 59% of the acid was removed in 30 minutes.

The electrolyte concentration after regeneration can be controlled at will. It depends upon the composition of the initial electrolyte fixed, the quantity fixed, the extent of regeneration, the initial electrolyte composition of the medium in which regeneration occurs and the amount retained upon the electrodes. In one example, in which fixation occurred in a cell having an electrode area of 450 square inches, and regeneration was initiated in distilled water, the final electrolyte contained 6.66% sulfuric acid. This was built up by three additional electrode regeneration cycles to a concentration of 17.15% sulfuric acid.

The electrodes of the present invention may have any suitable form, but it is generally preferred to have a high surface area exposure, which is characteristic of the conventional pasted type electrodes which give the porous type active electrode areas. However, any type electrode suitable for service in the Pb-acid cell will be satisfactory for this duty. The waste liquors or effluents that may be considered the raw materials for the recovery procedure may be those obtained from various chemical processing plants, such as those which produce viscose rayon, cellophane, and other synthetic filaments, from processing plants which utilize sulfuric acid coagulating media, and the like. Waste liquors containing from $\frac{1}{10}$ to 10% of sulfuric acid are amenable to recovery of sulfuric acid by such a process. Such liquors may also contain from $\frac{1}{2}$ to 25% of sulfates of alkali metals, such as sodium or potassium, and they may contain up to 10% of sulfates of alkaline earth metals and of other metals in the second group of the periodic table, such as magnesium, zinc, and the like. As indicated above, a typical waste effluent from a viscose rayon plant containing about $\frac{1}{2}$% of sulfuric acid, about 1% of sodium sulfate and 0.03% zinc sulfate can be satisfactorily processed in accordance with the present invention with the recovery of the sulfuric acid in a reasonably concentrated form up to 40%. During electrolysis, the waste liquor becomes less and less acid. The fixation of lead sulfate may be stopped at any pH desired but is preferably stopped before a pH of 7 is exceeded.

When a salt of one of the alkaline earth metals or zinc sulfate is present, such salt may be recovered by precipitation from the electrolyzed solution after its removal from the cell. For example, in the viscose rayon industry, the zinc salt may be recovered by treatment with sodium sulfide after neutralization if necessary. The waste sodium sulfide solution obtained from the desulfurizing stage of viscose, rayon manufacture may be used for this purpose. Instead of using sodium sulfide as a precipitant, the zinc may be precipitated as $Zn(OH)_2$ by rendering the solution alkaline. The zinc hydroxide may be recovered as such by filtration and drying, or it may be converted to ZnO by heating in the conventional way. Such zinc compounds obtained after recovery by filtration or other conventional means may, under suitable conditions, have reuse, such by means not shown) enters the system via line 13 and pump 14. A slurry of catalyst and oil, produced as hereinafter described, is introduced into the oil feed via line 15. The oil feed then picks up hot freshly regenerated catalyst from the regenerator standpipe 16. The amount of catalysts introduced into the oil in this type of cracking unit is usually between about 10 and 25 parts by weight for each part of oil. The mixture of catalyst and oil then passes into the reactor 1 via line 17. Reactor 1, as illustrated, is a conventional down-flow type of fluid catalyst reactor. In reactor 1 the oil contacts a bed of fluidized catalyst under conditions conductive to the desired conversion of the particular oil feed. In general, the conditions are about as follows:

Pressure _____ 0–10 atmospheres
Temperature _____ 700° F.–1100° F.
Liquid hourly space velocity _____ 0.4–6

The hydrocarbon vapors pass through internal cyclone separators (not shown) to remove the bulk of the suspended catalyst particles and then pass out of the top of the reactor via line 18 to fractionator 4.

In fractionator 4 the product is separated into the desired fractions. Thus, gasoline plus gas may be removed via line 19, light gas oil or naphtha may be removed via line 20, heavy gas oil may be removed via line 21, and a heavy oil may be removed from the bottom via line 22. This heavy oil may be passed through a waste heat boiler or cooler 23 and a part of it recycled back to the fractionator via pump 24 and lines 25 and 26 to quench or desuperheat the feed. This heavy oil contains some fine catalyst particles which escaped separation by the cyclone separators in reactor 1; the part not recycled is therefore preferably passed to a thickener 8. Relatively clean oil is withdrawn via line 27 and the thickened slurry of catalyst is withdrawn via line 15 and recycled, as described.

A portion of the catalyst in reactor 1 substantially equal to the amount of catalyst introduced via line 17 is continuously withdrawn from the bottom through valved line 28 into line 29. This catalyst is picked up by a stream of air from blower 7 and carried up into regenerator 2.

Regenerator 2, as illustrated is a conventional down-flow fluid catalyst regenerator. The air stream passes up through the fluidized bed of catalyst in regenerator 2, burning combustible deposits from the catalyst particles. A portion of the hot regenerated catalyst is continuously withdrawn from the regenerator 2 via standpipe 16 and introduced into the reactor, as described.

In order to avoid overheating in the regeneration, it is usually necessary to cool the catalyst, and this is done by recycling a portion of the catalyst through recycle catalyst cooler 9. Thus, catalyst is withdrawn via standpipe 30, picked up by a stream of air, and passed up through recycle cooler 9 back into the regenerator. The air stream is produced by blower 7 and flows via lines 31, 32, 33 and 34.

The hot regeneration gases, after passing up through the catalyst bed, pass through internal cyclone separators (not shown) to remove the bulk of the suspended catalyst particles and then pass out of the regenerator via line 35 to Cottrell precipitator 3. In order to increase the efficiency of the Cottrell precipitator, it is desirable to condition the gas by adding ammonia and/or steam via line 36 and to cool it to about 500° F. by means of a waste heat boiler 10.

The fine catalyst particles are largely removed from the regeneration gas by the Cottrell precipitator. The waste regeneration gas leaves the system via stack 37. A small amount of catalyst fines is lost with this waste gas. However, the amount is generally too small to provide for a suitable catalyst replacement rate. The catalyst collected by the Cottrell precipitator is withdrawn via standpipe 38 and carried by the air stream via line 34 back to the regenerator wherein it mixes with the main catalyst mass.

In order to provide for a catalyst replacement rate above that afforded by the normal catalyst losses from the system, a portion of the catalyst is separated and treated as described above to remove a fraction which is rich in less active particles and therefore below normal activity. In the system illustrated in Figure 1 a portion of the catalyst is withdrawn from the regenerator via branch line 39 of line 30. This withdrawn portion is picked up by an air stream entering via line 40 and carried via line 41 to a system designed to afford the separation of a relatively narrow fraction of the catalyst particles by elutriation. In the system illustrated, a series of separators 11 and 12 is used for this purpose. Thus, the particles above a given mass are collected in the first cyclone 11 and are returned to the regenerator via standpipe 42 and line 34. Cyclone 12 is adjusted to collect particles of lower mass than those collected by cyclone 11 and to pass particles below a given mass. Thus, the material collected by cyclone 12 consists largely of particles of an intermediate and preferably relatively narrow range of mass. The particles of lower mass than the desired minimum pass via line 42 to the Cottrell precipitator with the air stream and are collected and returned to the main catalyst mass along with the remaining Cottrell fines, as described. Other arrangements of cyclone separators or other devices, such as a conventional air elutriator, may be employed to separate the fraction, and the material treated to separate the fraction may be withdrawn from the reaction and regeneration system in other manners than that illustrated.

The fraction of catalyst separated and collected by cyclone 12 consists largely of particles having the same elutriation rate or settling tendency. As pointed out, this tendency is a function of both the particle size and the particle weight.

This fraction contains catalyst particles of all degrees of activity and has substantially the same catalytic activity as the main catalyst mass. In order to separate inactive or less active particles from more highly active particles, the fraction is withdrawn via line 43 to a screening machine 6 containing a screen 44 of such size (adjusted according to the particle range of the fraction treated) that the fraction screened is separated into two fractions. The efficiency of this separation in separating inactive particles depends, firstly, upon the narrowness of the fraction separated by the elutriation steps and, secondly, upon the amount of material passing the screen, the efficiency dropping as the percentage passing the screen increases. Thus, the screen and/or the elutriation step are preferably adjusted so that less than half of the material screened passes the screen. The material which passes the screen is the less active material and is withdrawn via line 45 to provide for catalyst replacement. The material which is retained on the screen passes to hopper 46 and there is withdrawn via line 47 to line 34 and recycled back to the main catalyst mass.

The amount of material separated and withdrawn via line 45 is adjusted to allow the desired catalyst replacement rate corresponding to the desired equilibrium activity. Thus if it is desired to raise the equilibrium activity, the amount of catalyst withdrawn and subjected to the separation treatment is increased. This results in withdrawal of a larger amount of less active catalyst. The catalyst replacement rate is then increased to maintain the desired amount of catalyst in the system. In a typical case, for example, the plant contains about 500 tons of catalyst; the Cottrell precipitator collects about 50 tons per day of catalyst fines, and about 2 tons per day of catalyst is lost through the Cottrell precipitator; the desired catalyst replacement rate is 5 tons per day; about 50 tons per day of the catalysts is passed via line 41 to the separator system, and about 10 tons per day of a relatively narrow fraction is separated in cyclone 12; this separated fraction is screened with a 300-mesh screen; about 7 tons per day of catalyst fails to pass the screen and is recycled; about 3 tons per day of catalyst passes the screen and is withdrawn.

Figure II illustrates an application of the sink-float method of separation. The plant and its operation are the same as described in connection with Figure I except for the manner of effecting the desired separation of less active catalyst. In the system illustrated in Figure II a portion of the catalyst is withdrawn from the regenerator via line 30 and picked up and carried by a stream of air via line 41 to a cyclone separator 11 as before. In this case, however, the finer catalyst particles are passed via line 50 to the recovery system. The fraction collected in cyclone separator 11 is not returned to the system as in Figure I, but is treated to separate a fraction of catalyst particles of higher apparent densities. The first step in the process is the treatment of the catalyst with a water-repellent substance in order to minimize entrance of the sink-float liquid into the pores of the catalyst particles. Vapors of a hydrocarbon oil, preferably an extract of petroleum nitrogen bases, enter via line 51. These vapors pick up the catalyst from cyclone separator 11 and carry it via line 52 to a second cyclone 53 where it is again collected. Unused hydrocarbon vapors are withdrawn via line 54. These vapors may be reused. The catalyst collected in cyclone separator 53 is discharged via line 55 into a mixing tank 56 where it is mixed with sink-float liquid entering via line 57. The mixture of catalyst and sink-float liquid is fed at a slow even rate via line 58 into separation tank 59. The less active catalyst is withdrawn from the bottom of tank 59 via line 60 to filter 61. The less active catalyst is withdrawn via line 62 and the sink-float liquid is passed via line 63 to a sump 64 from which it may be withdrawn and reused. Makeup liquid or a component thereof may be introduced via line 65 to compensate for losses and/or to make adjustments in density. The more active catalyst overflows tank 59 into a tray 66 from which it is passed via line 67 to a filter 68. The liquid passes via line 69 to the sump. The catalyst cake is slurried in oil in mixing tank 70 and the slurry is passed via line 71 into the feed line 13 of the reactor.

I claim as my invention:

1. In the application of a finely divided microporous silica-alumina cracking catalyst which declines in activity in use, the method of maintaining a high catalytic activity which comprises dispersing at least a portion of the used catalyst in a liquid having a density intermediate between the apparent density of the most dense and least dense particles of said catalyst, separating the fraction of floated catalyst particles from the liquid and returning it to use, separating the fraction of catalyst particles of higher apparent density from the liquid and discarding it, and substituting for the discarded fraction of particles of higher apparent density an equal quantity of fresh catalyst.

2. Process according to claim 1 in which the liquid used in said sink-float separation is an aqueous liquid and the portion of the catalyst subjected to said sink-float separation is coated with a water repellent agent to minimize adsorption of the aqueous liquid into the catalyst pores.

3. Process according to claim 1 in which the liquid used in said sink-float separation is an aqueous liquid substantially free of dissolved non-volatile material.

4. Process according to claim 1 in which the fraction of catalyst of lower apparent density separated by said sink-float procedure is calcined prior to reusing it in order to free it of the sink-float liquid.

5. The process of treating a mass composed of particles of porous solid catalytically active material, said particles having the same basic composition and differing in catalytic activity, which comprises introducing said mass into a body of liquid having a density adapted to float only a fraction of said particles, stratifying said mass into two fractions, the catalytic activity of the particles of one of said fractions differing from the catalytic activity of the particles of the other of said fractions, and separating the more catalytically active of said fractions from said body of liquid apart from the other of said fractions.

6. In processes for the conversion of hydrocarbons using solid hydrocarbon conversion catalysts that decline in catalytic activity when subjected to relatively high temperatures, the improvement which comprises effecting conversion of said hydrocarbons under conversion conditions in the presence of a relatively more catalytically active fraction of a total catalytically active contact mass composed of particles of said solid conversion catalyst previously subjected to relatively high temperatures, said particles having the same basic composition and differing in catalytic activity, which relatively more catalytically active fraction has been obtained by introducing said mass into a body of liquid having a density adapted to float only a fraction of said particles, stratifying said mass into two fractions containing particles of relatively higher and lower apparent densities respectively, the fraction containing the particles of relatively lower apparent density being more catalytically active than the other of said fractions, and separating the more catalytically active of said fractions from said body of liquid apart from the other of said fractions.

NORMAN E. PEERY.

(References on following page)

REFERENCES CITED

The following references are of record in the file of this patent:

UNITED STATES PATENTS

| Number | Name | Date |
|---|---|---|
| 1,151,117 | Moxham | Aug. 24, 1915 |
| 1,839,117 | Nagelvoort | Dec. 29, 1931 |
| 1,934,410 | Cummins | Nov. 7, 1933 |
| 2,206,337 | Steele | July 2, 1940 |
| 2,225,459 | Palmrose | Dec. 17, 1940 |
| 2,233,432 | Schramm | Mar. 4, 1941 |
| 2,257,157 | Connolly | Sept. 30, 1941 |
| 2,311,979 | Corson | Feb. 23, 1943 |
| 2,325,611 | Keranen | Aug. 3, 1943 |
| 2,329,299 | Rourke | Sept. 14, 1943 |
| 2,350,508 | Hemminger | June 6, 1944 |
| 2,350,730 | Degnen | June 6, 1944 |
| 2,355,016 | Stein | Aug. 1, 1944 |
| 2,391,334 | Nicholson | Dec. 18, 1945 |
| 2,410,436 | Ewing | Nov. 5, 1946 |

FOREIGN PATENTS

| Number | Country | Date |
|---|---|---|
| 3,248 | Great Britain | 1867 |

OTHER REFERENCES

Gaudin, "Principles of Mineral Dressing," 1939, pages 227–228.